(12) United States Patent
Hoerle et al.

(10) Patent No.: US 7,827,562 B1
(45) Date of Patent: Nov. 2, 2010

(54) SYSTEM AND METHOD FOR FLEXIBLE PUBLISHING AND CONSUMPTION OF DATA BETWEEN DISPARATE APPLICATIONS

(75) Inventors: Dale E. Hoerle, Naperville, IL (US); Jeffery K. Hensley, Genoa, IL (US)

(73) Assignee: The TriZetto Group, Inc., Newport Beach, CA (US)

(*) Notice: Subject to any disclaimer, the term of this patent is extended or adjusted under 35 U.S.C. 154(b) by 1400 days.

(21) Appl. No.: 11/154,375

(22) Filed: Jun. 16, 2005

(51) Int. Cl.
G06F 9/44 (2006.01)
G06F 15/173 (2006.01)

(52) U.S. Cl. ............... 719/313; 719/328; 709/238

(58) Field of Classification Search ............ 719/310, 719/313, 321, 328; 709/201, 203, 226, 238, 709/246
See application file for complete search history.

(56) References Cited

U.S. PATENT DOCUMENTS

| | | | |
|---|---|---|---|
| 5,339,434 A | 8/1994 | Rusis | 709/246 |
| 5,410,675 A | 4/1995 | Shreve et al. | 710/65 |
| 5,493,671 A | 2/1996 | Pitt et al. | 1/1 |
| 5,539,787 A | 7/1996 | Nakano et al. | 375/377 |
| 5,581,558 A | 12/1996 | Horney, II et al. | 370/401 |
| 5,708,828 A | 1/1998 | Coleman | 715/205 |
| 5,793,771 A | 8/1998 | Darland et al. | 370/467 |
| 5,815,689 A | 9/1998 | Shaw et al. | 713/400 |
| 6,094,684 A | 7/2000 | Pallmann | 709/227 |
| 6,111,893 A | 8/2000 | Volftsun et al. | 370/466 |
| 6,256,676 B1* | 7/2001 | Taylor et al. | 709/246 |
| 6,289,382 B1 | 9/2001 | Bowman-Amuah | 709/226 |
| 6,332,163 B1 | 12/2001 | Bowman-Amuah | 709/231 |
| 6,339,832 B1 | 1/2002 | Bowman-Amuah | 714/35 |
| 6,393,494 B1 | 5/2002 | Hyder et al. | 719/321 |
| 6,453,356 B1 | 9/2002 | Sheard et al. | |
| 6,658,630 B1 | 12/2003 | Threatt et al. | 716/3 |
| 6,665,685 B1 | 12/2003 | Bialic | 1/1 |
| 6,704,726 B1 | 3/2004 | Amouroux | |
| 6,738,975 B1* | 5/2004 | Yee et al. | 719/310 |
| 6,757,689 B2 | 6/2004 | Battas et al. | 1/1 |
| 6,792,431 B2 | 9/2004 | Tamboli et al. | |
| 6,954,757 B2 | 10/2005 | Zargham et al. | 1/1 |
| 7,020,717 B1* | 3/2006 | Kovarik et al. | 709/238 |

(Continued)

OTHER PUBLICATIONS

Chiang "Development of Reusable Components Through The Use of Adapters", 2002 IEEE, 10 pages.*

(Continued)

Primary Examiner—Van H Nguyen
(74) Attorney, Agent, or Firm—King & Spalding LLP

(57) ABSTRACT

A system and method are provided that enable flexible publishing and consumption of data between disparate applications. In one embodiment, a system comprises a first application and an adapter interfaced with the first application. The adapter is operable to publish data of the first application for consumption by another application, wherein the adapter publishes the data of the first application according to a publishing regime not natively supported by the first application. In certain embodiments, the adapter publishes data of an application in a plurality of different formats (e.g., database format, file format, messaging format), and consuming application(s) can then selectively access any of the plurality of different formats in which the data is published. In certain embodiments, a consumption log is maintained by an adapter that provides information concerning consumption of data by one or more consuming applications.

24 Claims, 7 Drawing Sheets

U.S. PATENT DOCUMENTS

| | | | |
|---|---|---|---|
| 7,136,857 B2 | 11/2006 | Chen et al. | 1/1 |
| 7,454,440 B2 * | 11/2008 | Green et al. | 707/104.1 |
| 7,526,507 B2 * | 4/2009 | Holloway et al. | 707/200 |
| 2002/0046301 A1 | 4/2002 | Shannon et al. | 719/328 |
| 2002/0116454 A1 | 8/2002 | Dyla et al. | 709/203 |
| 2002/0143819 A1 | 10/2002 | Han et al. | 715/237 |
| 2002/0156664 A1 | 10/2002 | Willcox et al. | 705/7 |
| 2002/0165903 A1 * | 11/2002 | Zargham et al. | 709/202 |
| 2003/0105884 A1 | 6/2003 | Upton | 719/318 |
| 2003/0109271 A1 | 6/2003 | Lewis et al. | 455/517 |
| 2003/0172368 A1 * | 9/2003 | Alumbaugh et al. | 717/106 |
| 2003/0177412 A1 * | 9/2003 | Todd | 714/25 |
| 2004/0054969 A1 * | 3/2004 | Chiang et al. | 715/513 |
| 2005/0015439 A1 * | 1/2005 | Balaji et al. | 709/203 |
| 2005/0015619 A1 * | 1/2005 | Lee | 713/201 |
| 2006/0059230 A1 | 3/2006 | Dykas et al. | 709/206 |
| 2006/0085361 A1 * | 4/2006 | Hoerle et al. | 705/75 |
| 2006/0085376 A1 * | 4/2006 | Hoerle et al. | 707/1 |
| 2006/0085796 A1 * | 4/2006 | Hoerle et al. | 719/313 |
| 2006/0085799 A1 | 4/2006 | Hoerle et al. | |
| 2006/0253860 A1 * | 11/2006 | Hoerle et al. | 719/328 |

OTHER PUBLICATIONS

Jin et al. "Transparent Reverse Engineering Tool Integration Using A Conceptual Transaction Adapter", 2003 IEEE, 10 pages.*

Kwak, et al., "Framework Supporting Dynamic Workflow Interoperation and Enterprise Application Integration," 2002 IEEE, pp. 108.

Iwasaki, et al., "Distributed Adapter Technology for Enterprise Network Operations Support," 2002 IEEE, pp. 875-877.

Xiong, et al., "Middleware-Based Solution for Enterprise Information Integration," 2001 IEEE, pp. 687-690.

International Search Report for Application No. PCT/US05/037124, 3 pp., dated Feb. 26, 2007.

Written Opinion for Application No. PCT/US05/037124, 10 pp., dated Feb. 26, 2007.

* cited by examiner

SYSTEM AND METHOD FOR FLEXIBLE PUBLISHING AND CONSUMPTION OF DATA BETWEEN DISPARATE APPLICATIONS

CROSS-REFERENCE TO RELATED APPLICATIONS

The present application is related to co-pending and commonly assigned U.S. patent application Ser. No. 10/965,253 filed Oct. 14, 2004 titled "INTERFACING DISPARATE SOFTWARE APPLICATIONS," the disclosure of which is hereby incorporated herein by reference.

TECHNICAL FIELD

This disclosure relates generally to interfacing between disparate software systems and, more particularly, to adapters enabling flexible publishing and consumption of data between disparate software systems.

BACKGROUND OF THE INVENTION

Enterprises, such as business enterprises, governmental enterprises, and private enterprises, often employ a number of systems (whether hardware, software, or combinations thereof) for providing functionality useful to the operation of the enterprise. For example, an enterprise may employ a complex computer network and communication system in order to facilitate information communication, processing, storage, analysis, modeling, et cetera. The aforementioned computer network may provide desired functionality through the use of various software systems, such as may comprise one or more software applications (referred to herein as applications) addressing particular aspects of the enterprise operations.

As but one example, for an enterprise providing healthcare services such applications may include a case management application, a credentialing application, a financial application, a membership management application, a commissions application, a customer service application, a provider network management application, a claims processing application, et cetera. Efficient operation of the enterprise may suggest that information from one or more such application should be exchanged with another one or more such application. However, each such application may utilize proprietary data formats, incompatible data inputs/outputs, or otherwise present barriers to their directly interfacing for desired information exchange making these applications not only disparate with respect to function but also disparate with respect to interfacing.

Further compounding the difficulties associated with the ability to provide information exchange between such an enterprise's applications, an enterprise may utilize more than one of any or all of the foregoing applications, wherein one or more applications providing a same or similar function may also be disparate. For example, a healthcare services enterprise may acquire or merge with another healthcare services enterprise, each having a number of systems, including different ones of the foregoing applications, for providing functionality useful to the operation of the enterprise. Thus, for example, an insurer (an example of a healthcare services enterprise) may comprise a plurality of disparate claims processing applications. Migration to one platform is likely to be costly and time consuming, thereby resulting in various legacy applications being used in parallel with other applications providing the same or similar functionality.

Approaches to providing integration between enterprise applications have included enterprise application integration (EAI) efforts which typically result in an EAI application uniquely tailored to a situation to provide interfacing between a plurality of specific enterprise applications. Moreover, EAI applications typically adopt a "stove pipe" configuration wherein they implement proprietary data interchange architecture and are adapted for use with only specific applications. If an enterprise, using a typical EAI application to provide interfacing between applications, changes, adds, or removes an application, the interface provided will be broken. Therefore, the EAI application will require corresponding modification, such as to add a new interface or modify an existing interface in order to support changes with respect to the enterprise applications. Such EAI application modifications are typically costly and time consuming, resulting in a reluctance, or an inability, to implement enterprise application changes.

In view of the above, it is often desirable for one or more applications to consume data from a disparate application. Typically, a given application publishes data, if at all, according to an inflexible publishing regime. That is, applications typically publish data, if at all, according to a fixed regime that offers only one format and a set schedule at which the data is published. It becomes the responsibility of the consuming application to adapt its consumption to the publishing regime of the application from which the consuming application desires data. For instance, the consuming application is required to adapt to the format in which another application (from which it desires data) publishes the data. And, the consuming application is further required to adapt to the content that the other application chooses to publish. For instance, the consuming application is required to interpret the content to transform it into the proper format in order to make sense out of it. As a simple example, an application may publish individuals' names in last-name-first format (e.g., "Doe, John" for the name John Doe). If a consuming application desires the names in a different format, such as first-name-first (e.g., "John Doe"), then the consuming application is required to translate the published names to the appropriate format. As a further example, the publishing application may publish an application-specific identifier for an individual (e.g., "X123"), instead of the individual's name, wherein the consuming application is required to adapt its operation to the identifier or to translate the identifier to the corresponding name (if this information is available to the consuming application).

As with, all interfaces, typically whenever an application is upgraded, changes are made to the data that it publishes, which in turn requires modifications in the consuming system (s) in order to be able to consume the data of the upgraded application. Again, the burden involved with creating and maintaining interfaces for enabling various disparate applications to interact and share/communicate data between them has traditionally been substantial. Accordingly, a need exists in the art for a technique that enables disparate applications to share data more easily.

BRIEF SUMMARY OF THE INVENTION

The present invention is directed to a system and method which provide flexible publishing and consumption of data between disparate applications. According to at least one embodiment, a system comprises a first application and an adapter interfaced with the first application. The adapter is operable to publish data of the first application for consumption by another application, wherein the adapter publishes the data of the first application according to a publishing regime not natively supported by the first application. As used herein, publishing data refers to an application making such published data accessible by consuming applications. In general, published data is data that the publisher (e.g., publishing application or adapter) intentionally makes accessible for consumption by other applications. An application may, for example, have much data that it uses, and the application may store such data in a particular format for its internal usage; and the application may selectively publish only certain portions of such data for consumption by other applications, and the application may publish such data in a different format than that which it uses internally. Much as organizations publish press releases to notify the public of select information about the organization, an application may select to publish certain information to enable other applications knowledge of that information. A "publishing regime," as used herein, refers to the method used for publishing data, and encompasses such aspects of publishing as the data format used for publishing and the schedule according to which data is published, as examples.

In certain embodiments, the adapter enables flexible scheduling of the publishing of data of an application. Thus, for instance, the adapter may standardize the publishing schedule of certain data across a plurality of disparate applications. For example, a health-care system may include a plurality of different insurance claim processing applications and a case management application, wherein a first insurance claim processing application may publish its claim information twice a day, a second insurance claim processing application may publish its claim information hourly, and a case management application may publish its claim information once a day. An adapter may be provided to publish the claim data of each of these applications on a common schedule (e.g., twice per day). Further, a publishing schedule may be defined for the adapter to publish different types of data according to different schedules. The publishing schedules implemented by the adapter may differ from the publishing schedules natively supported by the associated application.

Further, according to at least one embodiment, data can be published differently by an adapter when a consuming application initially requests data, than for subsequent publishes. For example, when data from a given application is initially published to a consuming application (i.e., the very first time the data is published to this consuming application), this "initial data load" (or "IDL") may be handled differently by the adapter than subsequent publishing because for this initial data load the consuming application may need all data. From that point forward, however, the consuming application may only desire changes in the data (e.g., data that has been modified, added, deleted, etc.) since the previous successful consumption by the consuming application.

For example, in one embodiment, the IDL is designed to publish data that represent the current state of the publishing application when the consuming application goes into production (i.e., initially encounters the publishing application). Traditional interfacing technologies, such as EAI, typically focus on publishing the day-to-day transactions from one system to another. These interfacing technologies require the custom development of a publishing mechanism to load the initial set of data which represents the current state of the data. For example, a consumer application may need to have a list of members in a health plan resident in its own datastore. The daily transactions will include adds, changes, deletes, etc. to membership that occurred during the day. The consumer application must have the original list of all members loaded in its datastore before it can apply the day-to-day transactions in a meaningful manner. Thus, embodiments of the present invention alleviate the development of a custom publishing application to load the initial data, as the adapter is capable of handling the IDL.

In certain embodiments, the adapter publishes data of an application in a plurality of different formats (e.g., database format, file format, messaging format), and consuming application(s) can then selectively access any of the plurality of different formats in which the data is published. Thus, greater flexibility is provided in that the consuming application(s) can consume the data of a disparate application in a format natively supported by the disparate application (e.g., in the format in which the disparate application natively publishes data), if any, and/or in any of the different formats in which the adapter publishes the data. Further, in certain embodiments, the adapter transforms the content of the data to at least one standardized format. For example, an individual's name may be published by the adapter for any application as first name followed by last name (e.g., "John Doe"), and thus irrespective of whether a given application natively publishes an individual's name in last-name-first format (e.g., "Doe, John"), application-specific identifier format (e.g., "X123"), or some other format, the adapter publishes the individual's name in a standardized format across each of the applications.

In this manner, the content published by the adapter for each application can be standardized across a plurality of disparate applications. As one example, an application may natively publish an individual's name, but while accompanying information for such individual (as address, age, gender, etc.) may be stored in one or more data stores of the application, the application may not natively publish that accompanying information. On the other hand, another application may natively publish an individual's name and age, but not such accompanying information as address and gender. Still a further application may not natively publish any information. Yet a further application may natively publish an application-specific code or identifier (e.g., "X123") for an individual, rather than the individual's name, along with address, age, and gender information for the identified individual. In certain embodiments, the adapter for each of the above applications retrieves the appropriate information to publish the individual's name, address, age, and gender, for example. Thus, the adapter may transform the content of the data of each application to provide content that is not natively published by such application.

Thus, the content that is published for each application may be standardized by the adapters. It should be further recognized that in doing so, the adapter may aggregate data from various sources for a given application. For instance, a given application may have the name, address, age, and gender data stored across a plurality of different related databases, rather than stored to a single database. The adapter can, in certain embodiments, aggregate the data from various different data sources to provide a published output that includes all of such data. Without such an adapter, a consuming application would require a customized interface for each application from which it desires data to retrieve the desired content from all of the various sources (e.g., databases) across which the desired content resides for each application. Again, creating and maintaining such a customized interface for each of the various applications from which data is desired is undesirably burdensome.

In certain embodiments, the adapter provides a standardized format(s) according to which data is published between various applications that desire to consume such data. For example, within a health care system, such as a third-party payer health care system, it may be desirable for various applications within such system to share data with each other. In a third-party payer health care system, a "third party" (referred to herein generally as an "insurer") pays for health care services received by a member (or "insured") from a service provider (any person, such as a doctor, nurse, dentist, pharmacist, etc., or institution, such as a hospital or clinic, that provides medical care). Examples of such third-party payers (or "insurers") include an insurance company (e.g., BlueCross® BlueShield®, Aetna® Inc., etc.), Health Maintenance Organization ("HMO"), Preferred Provider Organization ("PPO"), or the Federal Government (e.g., Medicare). Insurer's often have various systems/applications, such as a claim processing system, member system, provider system, case management system, etc. that may each desire to share data. Further, as organizations merge or are acquired, different types of a given system may co-exist within the resulting organization. For instance, an insurer may have a plurality of different claim processing systems that it desires to share data between.

In accordance with certain embodiments provided herein, an adapter may be used to publish the data of each of the various applications/systems in one or more standardized format(s). Thus, adapters associated with the disparate applications transform the data of each of the disparate applications into at least one common format, wherein if each application is then capable of supporting the common format (e.g., via an adapter) then each application is further capable of consuming the published data of all other applications. Thus, separate interfaces between the various applications need not be specifically developed to enable them to consume data from one another, but rather, each consuming application need only be capable of consuming data in one of the standardized format(s) supported by the adapter. As described further herein, in certain embodiments, each consuming application may have an adapter coupled thereto to enable the consuming application to consume the published data. In such embodiments, the adapter associated with the consuming application translates the data published in a standardized format (by a publishing adapter) to the internal format desired by the consuming application. Thus, the consuming application need not have a customized interface for consuming data from various other applications, but instead, because the data of each of the other applications is published in a standardized format (by their respective publishing adapters), the consuming application's adapter can simply provide the translation from such standardized format to the format desired by the corresponding consuming application to enable the consuming application to consume data from all the various other applications.

The above-described adapter that is associated with an application for publishing data of such application may be referred to herein as a "publishing adapter," while the above-described adapter that is associated with an application for consuming published data may be referred to herein as a "consuming adapter." Of course, it should be understood that a publishing adapter and consuming adapter may be integrated within a single adapter for an application, thus enabling the application to publish data in a standardized format for easier consumption by other applications (e.g., via their respective consuming adapters) and enabling the application to consume data published by other applications (e.g., via their respective publishing adapters).

In certain embodiments, a consuming adapter can define how frequently it is to consume data from another application (publishing application) for its associated consuming application. For example, a publishing application may publish data on a daily basis, but a consuming application may only be capable or interested in consuming the data on a weekly basis. The associated consuming adapter, in accordance with certain embodiments provided herein, is designed to keep track of the last time that its associated consuming application successfully consumed data from the publishing application (i.e., in the below-described consumption log). Accordingly, the consuming adapter can request the proper data from the publishing application, such as all data changes that have occurred since the last successful consumption. Thus, the consuming application is not bound to the publishing application's schedule. The consuming application effectively receives all transactions that have occurred since the last execution (i.e., since its last successful consumption). In certain embodiments, a data publication manager (DPM) is used for managing the publication process, as described further herein. The flexibility afforded by embodiments of the present invention becomes even more advantageous when considering that multiple consuming applications may be interested in the same set of data (from a given publishing application), wherein each consuming application can run on a separate consuming schedule.

According to at least one embodiment, a system comprises a first application and a second application that desires to consume data from the first application. The system further comprises a publishing adapter communicatively interfaced with the first application and operable to publish data of the first application. The system further comprises a consuming adapter communicatively interfaced with the second application, wherein the consuming adapter maintains a consumption log that identifies at least the last successful consumption of the data of the first application by the second application.

Thus, in certain embodiments, a consumption log is maintained by an adapter, wherein the consumption log provides information concerning the consumption of data by its consuming application each of the one or more other publishing applications (e.g., identifying the time of the last successful data consumption from each of the publishing applications). Thus, the consuming application need not have an interface developed specifically for a given application in order to consume data from the given application and to keep track of the data needed at any given time from the given application. Instead, in certain embodiments, the consuming adapter coupled to the consuming application is operable to keep track of the consumption of data from a given publishing application by the consuming application so that the consuming adapter can determine at any given time the data (e.g., new/changed data) of the publishing application that is to be provided to the consuming application.

According to certain embodiments, the consumption log keeps track of published data has not been successfully consumed by the consuming application. Further, if the consuming application attempts to consume data but fails, the consuming adapter can provide data integrity since it keeps track of the last SUCCESSFUL transaction consumed. Also, as mentioned above, the publishing application and consuming application can operate on independent schedules without fear of losing or duplicating transactions. Additionally, multiple consuming applications can consume the same set of published data (i.e., from a given publishing application) on separate schedules.

In view of the above, because the adapters provide support for the publishing/consuming regimes desired by each application, the applications themselves are not required to be modified to support such regimes. For instance, the adapters handle the translation of data into a format desired (and includes the content desired) by a consuming application. Again, a publishing adapter may publish the data of a publishing application in one or more standardized formats (and including certain content, which may or may not be natively published by the publishing application), and a consuming adapter may receive such published data and translate the data from the standardized format into a format desired by the consuming application (including selecting from the published data the particular content desired by the consuming application). For example, the publishing adapter may publish data to a file (which may not be natively supported by the publishing application with which the publishing adapter is coupled), and such data published by the publishing adapter may include a large selection of data content (some of which may not be natively published by the publishing application), such as healthplan members' names, addresses, age, gender, benefit codes, medical services codes, etc. Further, each of the large selection of data content may be published in a standardized format, such as first-name-first, defined medical service codes, etc. A consuming adapter may receive the published data and determine the portion of that data content (which may be all of such published data content) desired by its consuming application, and translate the desired portion of such data content from the standardized format into a native format desired by the consuming application. Again, all of the support for the publishing regime is provided by the adapters and is transparent to the publishing and consuming applications.

As a further example of the adapters providing support for a desired publishing/consuming regime, as mentioned above and as described further herein, the consuming adapter may support consumption of data by its consuming application on a different schedule than the data is published by a publishing application (or publishing adapter). In certain embodiments, the consuming adapter maintains a consumption log to keep track of the last successful consumption by the consuming application of data from a given publishing application, which may aid in maintaining data integrity between the publishing and consuming applications. Again, support for consuming data on a schedule that differs from a publishing schedule, and maintaining data integrity, is provided by the adapters in a manner that is transparent to the consuming and publishing applications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
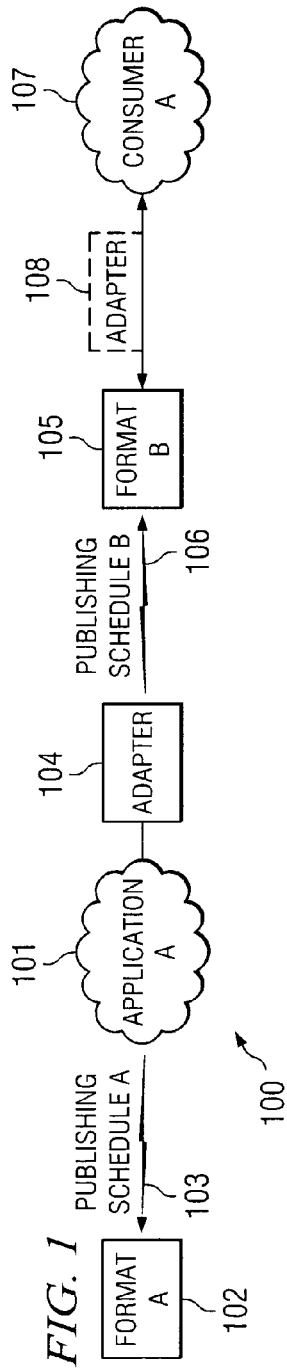
FIG. 1 shows an exemplary system implemented according to one embodiment of the present invention, in which an adapter is utilized to publish data from an application according to a publishing regime not natively supported by such application.

Various embodiments of the present invention are now described with reference to the above FIGURES, wherein like reference numerals represent like parts throughout the several views. Turning to FIG. 1, an exemplary system 100 implemented according to one embodiment of the present invention is shown. As shown, system 100 includes disparate applications 101 and 107, which may each be software applications executing on the same or disparate (e.g., networked) processor-based devices, such as personal computers (PCs), etc. In this example, application 101 is an application from which application 107 (a "consuming application") desires data. Application 101 natively publishes data in a format "A" 102 according to a publishing schedule "A" 103. While consuming application 107 does not natively support consumption of data in format A 102 and/or according to publishing schedule 103, it is desirable for consuming application 107 to consume the data of application 101.

One option for enabling consuming application 107 to consume the data of application 101 is to have users manually input data into consuming application 107 to reflect the data of application 101, and manually update such data within consuming application 107 as the data changes in application 101. However, this manual process is inefficient, costly, and prone to user error. Thus, it becomes desirable to enable consuming application 107 to be capable of consuming data of application 101 such that a user is not required to manually input such data. As described above, in prior techniques for enabling consuming application 107 to consume data of application 101 have required implementing a customized interface for consuming application 107 that is capable of reading the published data 102 of application 101 and translate that data into the data format desired by consuming application 107. As further described above, developing and maintaining such customized interfaces is undesirably burdensome. As described further herein, adapters are utilized to ease this burden, while enabling a consuming application the ability to consume data of a disparate application even though the consuming application does not support consumption of the data as natively published by such disparate application.

Adapters of embodiments of the present invention comprise instruction sets (e.g., software code) operable upon a processor based system. For example, an adapter of an embodiment of the present invention comprises one or more software modules operable upon a host system (e.g., server system) upon which an associated application is operable.

Adapter 104, which may be referred to in this example as a "publishing adapter," is communicatively coupled to application 101. Adapter 104 publishes data of application 101 according to a publishing regime not natively supported by application 101. For example, adapter 104 may publish the data of application 101 in one or more formats not natively supported by application 101, and/or according to a publishing schedule not natively supported by application 101. For instance, in the illustrated example, adapter 104 publishes the data of application 101 in format "B" 105 according to publishing schedule "B" 106. Consuming application 107 then consumes the data published by adapter 104. As described further herein, in certain embodiments, consuming application 107 may have an adapter (e.g., a "consuming adapter") 108 communicatively coupled thereto to enable such consuming application 107 to consume the data of application 101 published by adapter 104.

As will be explained further herein, utilizing adapter 104 for publishing the data of application 101 makes the data of application 101 more readily consumable to other applications, such as consuming application 107. For instance, the publishing regime (e.g., the data format, content, publishing schedule, etc.) can be standardized across a plurality of disparate applications via their respective publishing adapters. Thus, rather than requiring that consuming applications conform to the various publishing regimes, if any, natively supported by the disparate applications (such as requiring consuming application 107 to conform its consumption to the format A 102 and publishing schedule A 103 of application 101 in FIG. 1), the adapters enable the publishing regime of an associated application to be adapted to a common regime across the various disparate applications. For instance, publishing adapters can be implemented to transform the data of each of the disparate applications into at least one common format, wherein if each application is then capable of supporting the common format (e.g., via a consuming adapter, such as consuming adapter 108 of FIG. 1) then each application is further capable of consuming the published data of all other applications. As described further herein, consuming adapters, such as adapter 108, may be implemented to enable an application to consume data according to a consumption regime (e.g., consumption schedule, etc.) not natively supported by such application. Thus, separate interfaces between the various applications need not be specifically developed to enable the applications to consume data from one another, but rather, each consuming application (or its respective consuming adapter) need only be capable of consuming data in one of the standardized format(s) supported by the publishing adapter. If the consuming application is not capable of natively supporting one of the standardized format(s) in which a publishing adapter publishes data, a consuming adapter, such as adapter 108 of FIG. 1, may be interfaced with such consuming application to enable translation of the data from one of the standardized format(s) into a customized format desired by the consuming application. As illustrated further with the example of FIG. 2 below, this utilization of adapters greatly reduces the burden of prior techniques for enabling consumption of data between various disparate applications.

Figure 2:
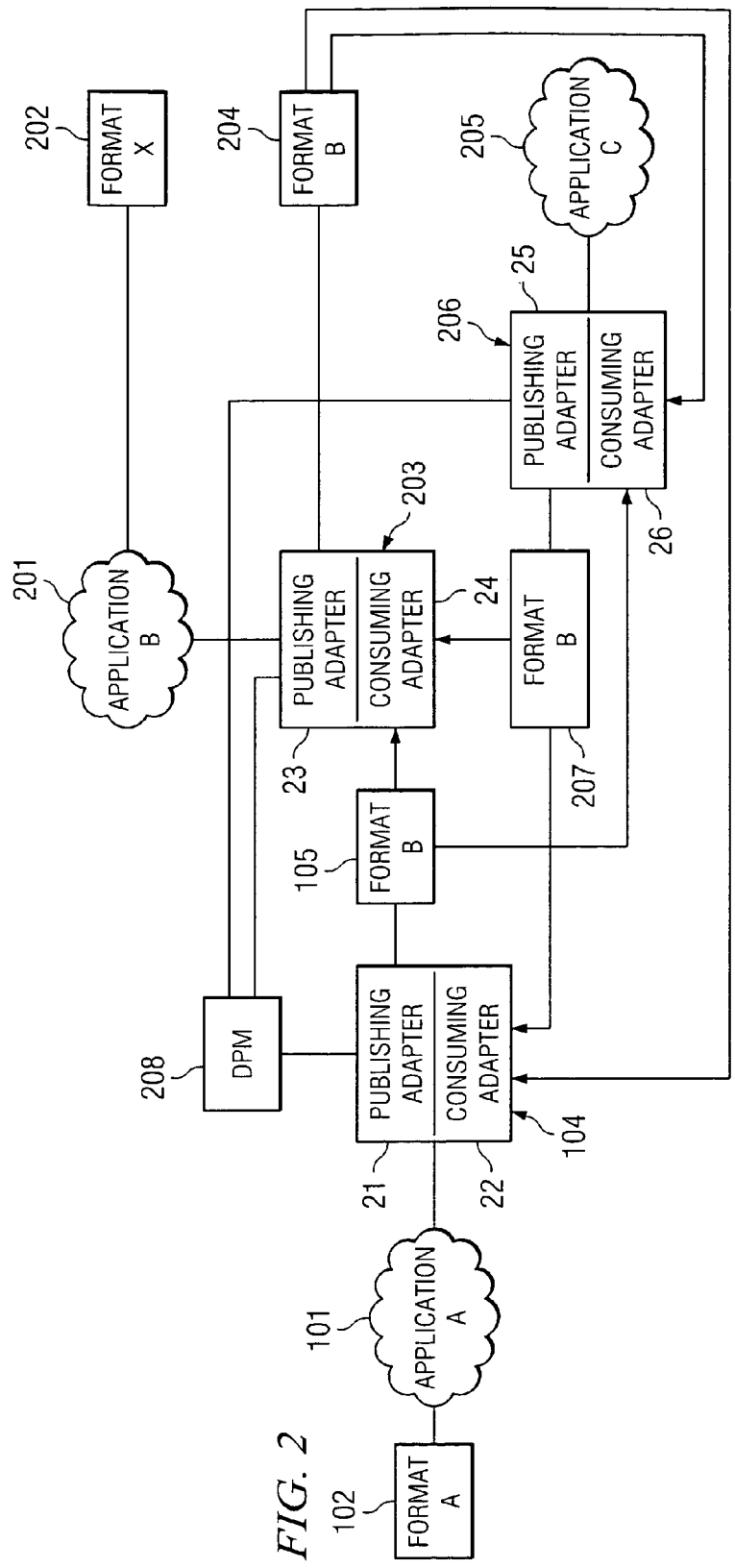
FIG. 2 shows an exemplary scenario enabled by an embodiment of the present invention, in which a plurality of disparate applications consume data from one another.

Turning to FIG. 2, an exemplary scenario enabled by an embodiment of the present invention is illustrated. In this example, three disparate applications 101, 201, and 205 are included within a system, and each application desires to consume data of the other applications. As one example of such a system, suppose a third-party payer health care system includes an insurance claim processing application, a case management application, a financial system, and a data warehouse. In such a system, it may be desirable for each of these applications to exchange data with one another. That is, it may be desirable for each application to consume data from each of the other applications. For example, the case management application may desire claim information in order to identify members (patients) who have a higher-than-average cost of medical care. The financial system may desire claim information in order to update accounts payable. And, the data warehouse may be a repository of historical information for analytical purposes, and thus may desire to receive claim information to be stored for later analysis. As another example, suppose a third-party payer health care system includes three different insurance claim processing applications (e.g., such different insurance claim processing applications may be legacy applications for different organizations that, over time, have merged into a common organization). In this case, it may be desirable to enable the disparate insurance claim processing applications (which do not natively support a common publishing regime) to consume data from one another.

In the illustrated example of FIG. 2, application 101 natively publishes its data in format "A" 102, application 201 natively publishes its data in format "X" 202, and application C does not publish its data for consumption by other applications. Prior techniques utilized for enabling each application to consume data from the other applications required a customized interface be developed specifically for each application from which data is desired to be consumed. For instance, to enable application 205 to consume data from each of applications 102 and 201, prior techniques required a first customized interface be developed for application 205 to enable it to consume data published by application 101 in format A 102, and a second customized interface be developed for application 205 to enable it to consume data published by application 201 in format X 202. Further, as upgrades are made to applications 101 and 201 that change their respective publishing regimes (e.g., data content, format, etc.), the customized interfaces developed for application 205 require maintenance to comply with the changes in applications 101 and 201. Thus, changes in the publishing applications 101 and 201 dictated maintenance/changes in the customized interfaces developed for the consuming application 205. Thus, an undesirably heavy burden arises in developing and maintaining the various customized interfaces to enable a given application to consume data from various other disparate applications.

Embodiments of the present invention ease that burden by implementing adapters in the manner described herein. For instance, in the exemplary scenario of FIG. 2 an adapter is implemented for each of the disparate applications 101, 201, and 205. More specifically, adapter 104 is communicatively coupled to application 101; adapter 203 is communicatively coupled to application 201; and adapter 206 is communicatively coupled to application 205. Further, in this example, each of the adapters includes both a publishing adapter and a consuming adapter. That is, logic for both publishing data and consuming published data is included in each adapter. Of course, in alternative embodiments, one or more of the adapters may include only one of publishing and consuming logic. Also, in alternative embodiments, the publishing and consuming logic may be implemented in disparate adapters, rather than being integrated in a common adapter as shown in this example. In the illustrated example of FIG. 2, adapter 104 includes publishing adapter 21 and consuming adapter 22; adapter 203 includes publishing adapter 23 and consuming adapter 24; and adapter 206 includes publishing adapter 25 and consuming adapter 26.

In this example, each of the publishing adapters 21, 23, and 25 publishes data from its respective application in a standardized format, format "B". For instance, publishing adapter 21 publishes data from application 101 in format B 105; publishing adapter 23 publishes data from application 201 in format B 204; and publishing adapter 25 publishes data from application 205 in format B 207. While the standardized format "B" is the specific focus in this example for ease of illustration and explanation, as will be described further herein, various other aspects of the publishing regime may be implemented by each publishing adapter, including standardizing the content of the published data, publishing schedules, etc. Further, while each publishing adapter publishes data in one format, format B, in this example, as described further herein certain embodiments of the publishing adapter enables publishing in a plurality of different formats, wherein the consuming applications can selectively consume data from any of such formats.

Now that the data of each application is published by the publishing adapters in a common format, format "B," the consuming adapters associated with each application are operable to consume the data in such format B. That is, the consuming adapters are each operable to translate the data from the format B into its respective application's desired format (i.e., its application's native format). Of course, if a given application desires the data in format B, such application may be capable of consuming the data without utilizing a consuming adapter. Similarly, any application that may natively publish its data in accordance with format B need not have a publishing adapter associated therewith.

As shown, consuming adapter 22 is operable to enable application 101 to consume the data 204 and 207 published for applications 201 and 207, respectively. Thus, the consuming adapter 22 writes the published data 204 and 205 into the appropriate native format supported by application 101. Similarly, consuming adapter 24 is operable to enable application 201 to consume the data 105 and 207 published for applications 101 and 205, respectively. Thus, the consuming adapter 24 writes the published data 105 and 207 into the appropriate native format supported by application 201. Finally, consuming adapter 25 is operable to enable application 205 to consume the data 105 and 204 published for applications 101 and 201, respectively. Thus, the consuming adapter 25 writes the published data 105 and 204 into the appropriate native format supported by application 205. It should be recognized that in some cases a given consuming application may not desire to consume all of the data content that is published by a publishing adapter, and thus in certain embodiments the consuming adapter associated with such consuming application may select the desired content of that published to be translated into the appropriate format for consumption by the consuming application.

In view of the above, the burden associated with enabling each application to consume data of other applications is greatly reduced. For instance, a customized interface for consuming data in each of the various formats in which the disparate applications publish data is not required. For example, a customized interface for application 205 to enable it to consume data from application 101 in application 101's native format A 102 is not required, nor is a customized interface for application 205 to enable it to consume data from application 201 in application 201's native format X 202. Rather, consuming adapter 26 need only be capable of translating from the standardized format B to the native format supported by application 205 to enable application 205 to consume data from each of disparate applications 102 and 201.

Further, if an update/change is made to a given application, the interfaces/adapters of the other applications are not affected. For example, if an update/change is made to application 101, the adapters 203 and 206 associated with applications 201 and 205 need not be modified. It should be recalled that in prior techniques the customized interface developed on each of applications 201 and 205 for consuming data from application 101 would have to be updated responsive to changes made in application 101 that results in a change to its published data 102. In this exemplary embodiment, changes made in application 101 do not require any modifications to applications 201 and 205 or their respective adapters 203 and 206. Only the adapter 104 associated with application 101 may have to be modified to account for the changes in application 101. For instance, publishing adapter 21 may need to be modified to account for changes in application 101 to ensure that such adapter 21 continues to properly capture the data of application 101 and publish such data in format B 105. Similarly, consuming adapter 22 may need to be modified to account for changes in application 101 to ensure that such adapter 22 continues to translate the data from format B (e.g., data 204 and 207 of applications 201 and 205) into the appropriate native format for consumption by application 101. Particularly as the number of disparate applications across which data is being shared increases, the benefit of not having to implement and maintain customized interfaces for each application is substantial.

In one embodiment, control of the publishing process is achieved using an interaction between a Data Publication Manger application (DPM) 208 and sets of database control records. The control records are subdivided by source data type, called entities and subentities, to allow the DPM 208 to publish data in smaller, more manageable subsets. The source data is published either to a database table, a comma separated file, or both; depending on partner application desires. As shown in FIG. 2, each of adapters 104, 203 and 206 are communicatively coupled to DPM 208, and their corresponding applications 101, 201, and 205 are referred to as partner applications. There are three sets of records used by DPM 208 for high-level control: 1) schedule records, 2) control records, and 3) log records. In certain implementations, DPM 208 includes a web-based utility for allowing administrators to view and update these control records in real time.

Figure 6:
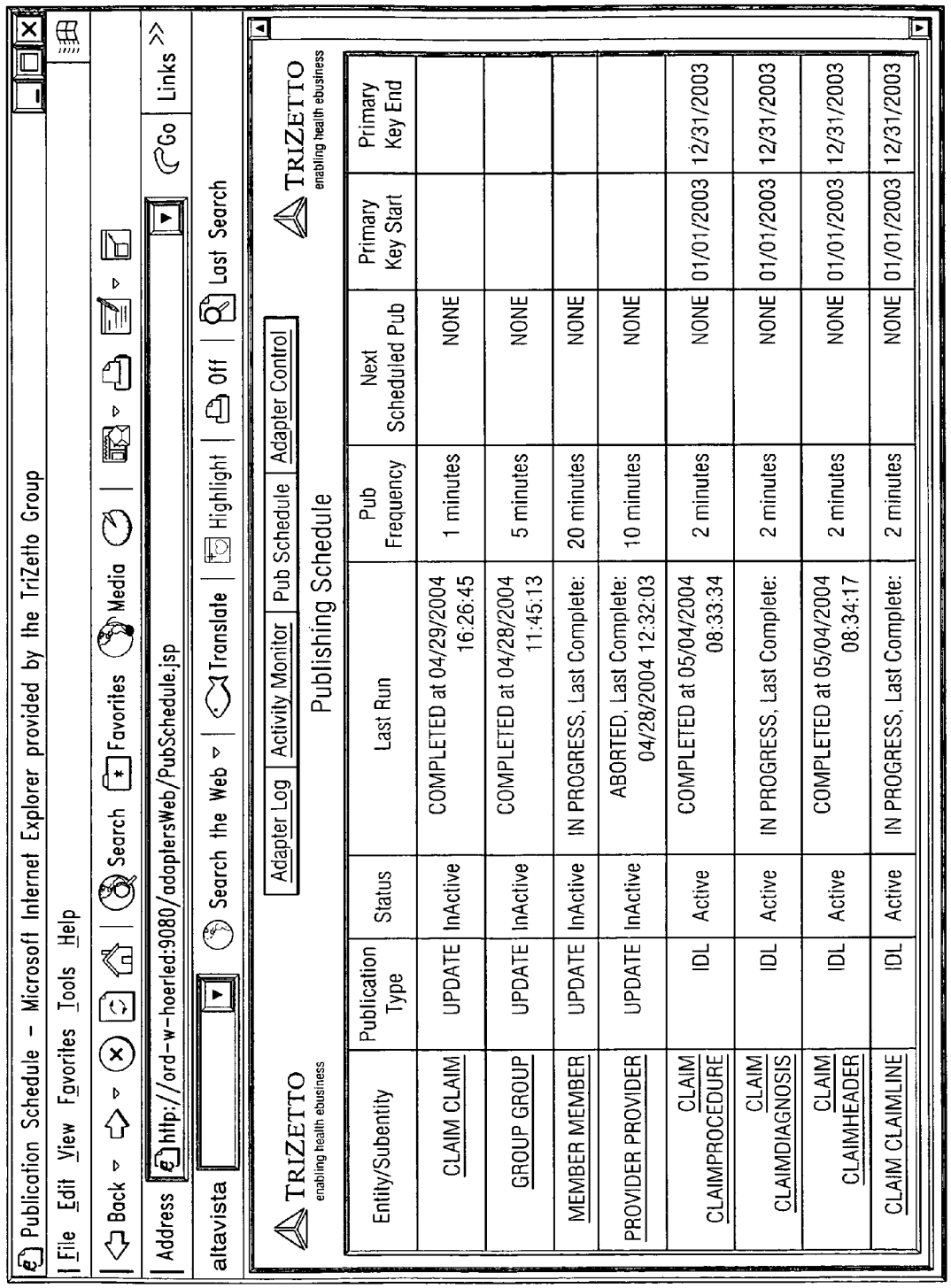
FIG. 6 shows an exemplary user interface for defining a publishing schedule for a publishing adapter.

In this exemplary embodiment, schedule records are used by DPM 208 to initiate publishing by monitoring a status field and a date/time field. An example of a publishing schedule that may be used by DPM 208 in this manner is shown in FIG. 6, which is discussed further below. DPM 208 continually polls the schedule table looking for any records that are set to an active status and whose date/time is equal to or earlier than the current system date/time. Any records meeting these criteria will be pulled and DPM 208 will initiate publishing on the entity/subentity found in that record.

DPM 208 then pulls a control record with matching entity/subentity names to manage the newly initiated publishing process using several relevant fields, such as batch number, status, and start/end times. When a publishing event is started, DPM 208 assigns a new batch number and start time to the record and sets the record status to In-process. This status setting prevents DPM 208 from simultaneously publishing two sets of data for the same entity/subentity. Once all data is published, DPM 208 will set the status and end time fields to show when it completed and whether any error condition was detected. Control records show the control data generated by the most recent publishing event.

Figure 8:
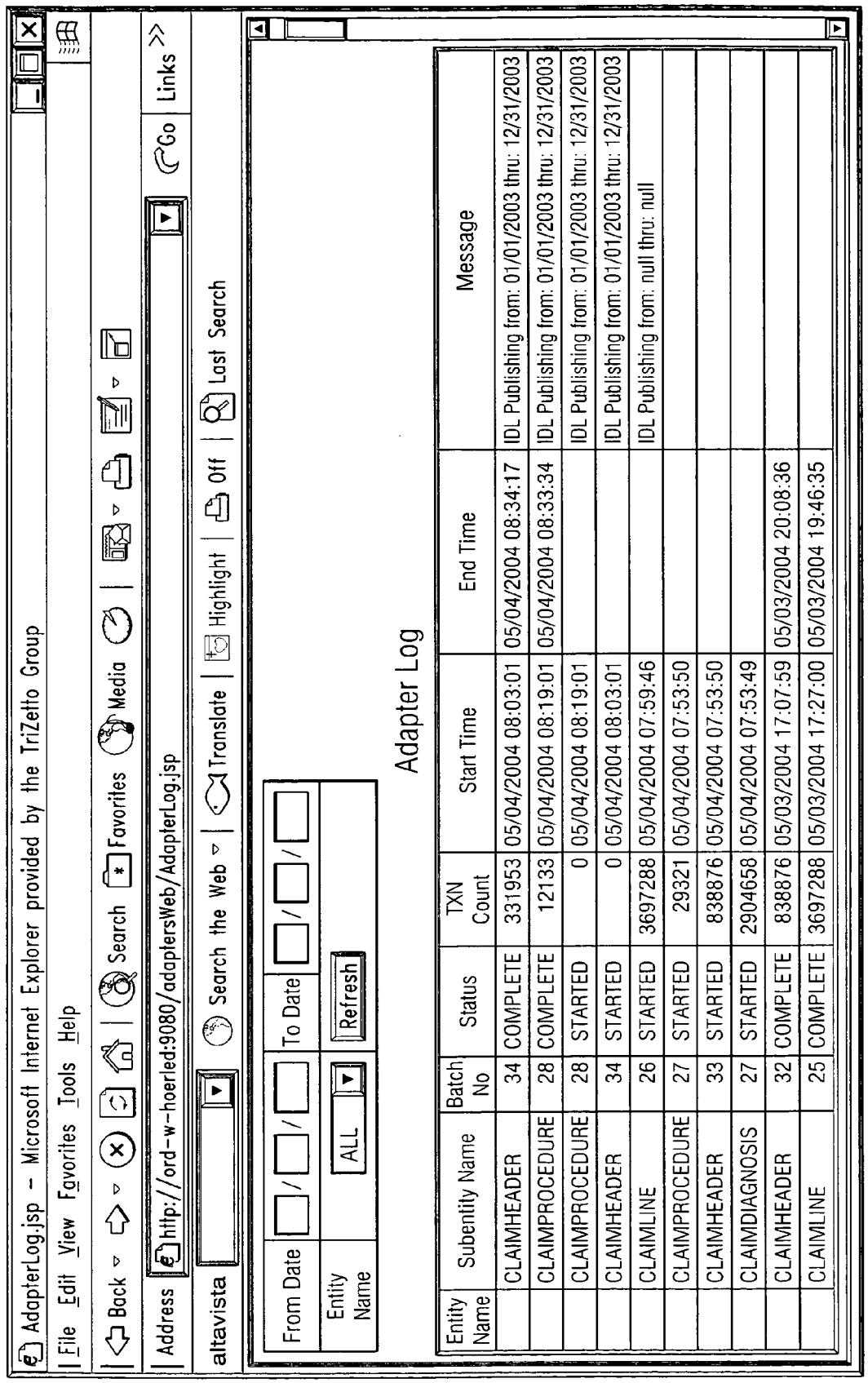
FIG. 8 shows an exemplary consumption log maintained by a consuming adapter in accordance with one embodiment.

To maintain data on all prior publishing events, DPM 208 uses a transaction log table. An example of such a transaction log is shown in FIG. 8, which is described further below. Each publishing event generates two log records, which are snapshots of the control record at publishing start and completion. The log records are identified using the entity/subentity (representing source data type), batch number, and status of each publishing event. The status field will reflect either start, complete, or error status. Any records with an error status also displays an appropriate error message to help the administrator rectify the error condition before initiating another publishing event. Only batches that complete successfully will be consumed by partner applications.

As described further below with FIG. 3, partner applications can be configured to consume published data from either the database tables or comma-separated files generated by DPM 208, as examples. If consuming data from the database, the partner application will poll the log table for all successful batches and consume each batch one at a time. If consuming from files, the partner application will receive a descriptor file for each batch successfully published. The descriptor file will contain the location and name of all the data files generated by each batch. The partner application uses the descriptor file to locate and consume all data contained in these files.

While each adapter is shown in the example of FIG. 2 as publishing data from its respective application in a common format, format B, in certain embodiments, each publishing adapter is operable to publish data from its associated application in a plurality of different formats. Turning to FIG. 3, an exemplary system 100₁ is shown according to one embodiment, in which adapter 104 publishes data in a plurality of different formats. In the illustrated example, adapter 104 publishes data from application 101 in a database format 304, file format 305, and message queue format 306. Each consuming application 107, 307, and 308 may selectively consume the data using any of the publishing formats. For instance, in the illustrated example, consuming application 107 consumes the published data via database format 304; consuming application 307 consumes the published data via file format 305; and consuming application 308 consumes the published data via message queue format 306. As shown with adapter 108 implemented for consuming application 107, one or more of the consuming applications 107, 307, and 308 may have a consuming adapter associated therewith to enable consumption of the published data (e.g., to translate the data from the specific published format to the native format of data in the consuming application). Further, each consuming application/consuming adapter may be implemented to consume certain data content from a first of the published formats (e.g., the database format 304) and consume certain other data content from a different published format (e.g., via message queue 306).

In publishing the data, the publishing adapter may aggregate data from various sources of its respective application. For instance, in the illustrated example of FIG. 3, application 101 has databases 301, 302, and 303 in which it stores data. The various databases may be related. For instance, database 301 may store, for each of a plurality of individuals, an identifier code for an individual and the corresponding individual's name; database 302 may store, for each of the plurality of individuals, an identifier code for an individual and the corresponding individual's address; and database 303 may store, for each of the plurality of individuals, an identifier code for an individual and the corresponding individual's gender. In publishing data in the formats 304-306, adapter 104 preferably aggregates data from the various databases 301-303 to, for example, include the names, addresses, and genders of the plurality of individuals in the content of the data published.

Additionally, in certain embodiments, adapter 104 translates the data into a consumable-friendly content. For instance, adapter 104 preferably translates application-specific content (e.g., application-specific codes, etc.) into the actual data represented by that application-specific content. For example, suppose that application 101 stores application-specific codes that represent various individuals (e.g., code "X123" represents "John Doe", etc.), and further suppose that application 101 stores application-specific codes that represent types of insurance claims (e.g., code "XYZ" represents a claim for a heart surgery procedure, etc.). In this case, adapter 104 preferably translates the application-specific format into data that is application-generic. For instance, adapter 104 would translate individual identifier X123 to John Doe for inclusion in the content of its published data, and adapter 104 would translate claim code XYZ to "Heart Surgery Procedure" (or a generic code that represents heart surgery procedure) for inclusion in the content of its published data. Similarly, consuming adapters may be operable to translate the published data into corresponding application-specific content (e.g., codes, etc.) for its respective consuming application. Continuing with the above example, for instance, a consuming adapter may translate the published "Heart Surgery Procedure" to an application-specific code for the consuming application (e.g., "HSP").

Figure 3:
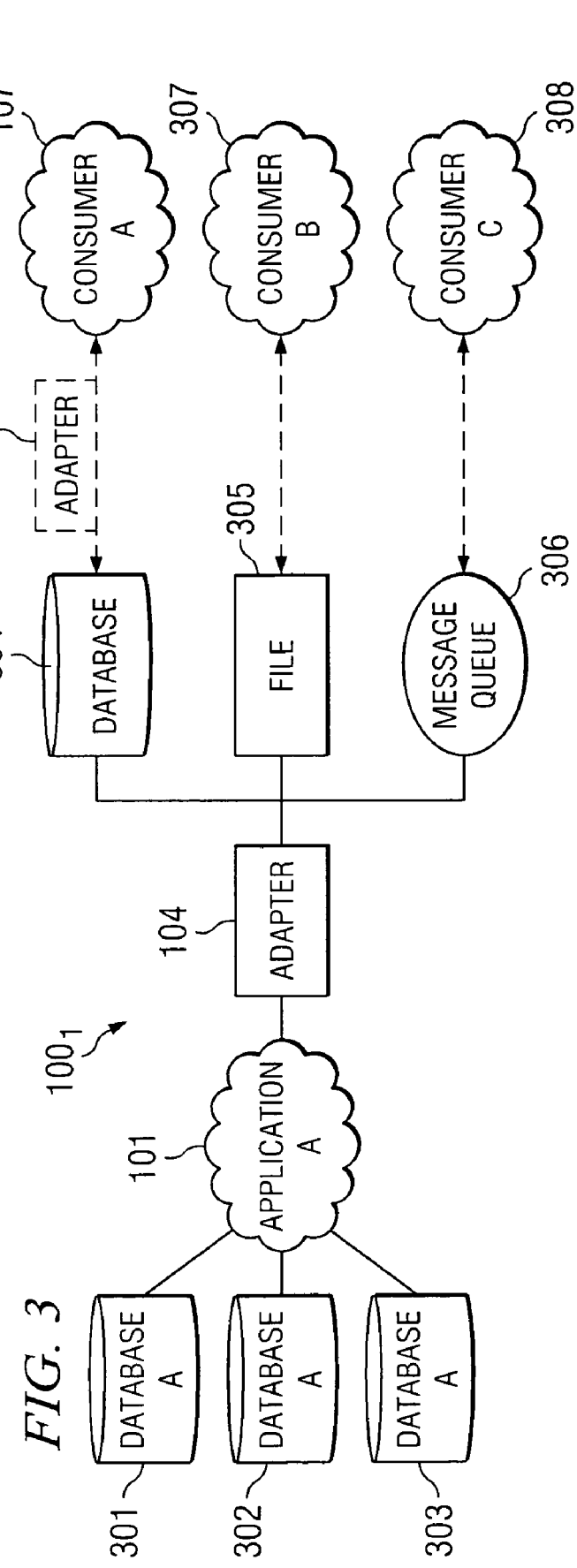
FIG. 3 shows an exemplary system according to one embodiment, in which an adapter publishes data from its respective application in a plurality of different formats.

While each of the consuming applications are shown as consuming data via a particular format in the example of FIG. 3, in certain embodiments the consuming applications can selectively consume data via different formats at different times. For instance, consuming application 107 may consume data via file format 305 for its initial data load (IDL), and thereafter consume data from application 101 via database format 304. Exemplary techniques for handling such initial data load for a consuming application are described further below. A publishing adapter for a given publishing application may be configured to implement a given publishing regime, such as publishing in certain formats and according to a certain publishing schedule. Likewise, a consuming adapter for a given consuming application may be configured to implement a given consuming regime, such as consuming certain data content in certain formats and according to a certain consuming schedule. The publishing and consuming regimes implemented for each publishing/consuming adapter may differ from adapter to adapter. For instance, different publishing schedules may be implemented for different publishing adapters, and different consuming schedules may be implemented for different consuming adapters. In certain embodiments, each publishing/consuming adapter may be configured as desired by a user (e.g., IT manager) for desired use with the adapter's associated publishing/consuming application. Of course, the publishing adapters all publish to one or more formats, etc. that enable the consuming adapters to support consumption of such data, as described further herein.

Figure 4:
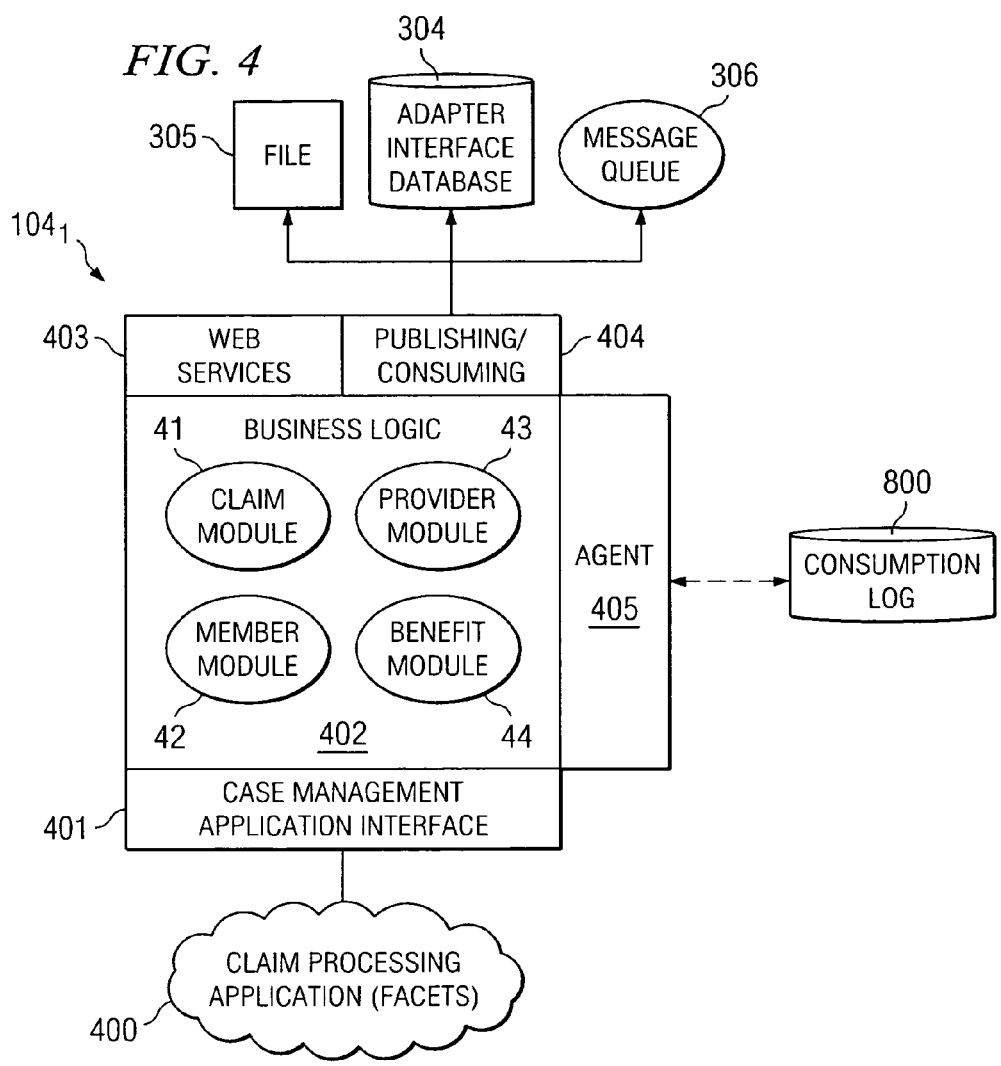
FIG. 4 shows an exemplary adapter configuration that may be implemented in accordance with certain embodiments of the present invention.

FIG. 4 shows an exemplary adapter configuration $104_1$ that may be implemented in accordance with certain embodiments of the present invention. Exemplary adapters that may be utilized in certain embodiments are described further in co-pending and commonly assigned U.S. patent application Ser. No. 10/965,253 filed Oct. 14, 2004 titled "INTERFACING DISPARATE SOFTWARE APPLICATIONS," the disclosure of which is hereby incorporated herein by reference. As described in certain embodiments of this referenced patent application titled "INTERFACING DISPARATE SOFTWARE APPLICATIONS," the adapter may include an application interface layer, a business logic layer, an adapter agent layer, and a communication layer. In the exemplary configuration of FIG. 4, adapter $104_1$ includes application interface layer 401 for interfacing with an application 400. In this illustrated example, the application 400 is a claims processing application commercially known as Facets® available from The TriZetto® Group, Inc.

Adapter $104_1$ further includes business logic layer 402, which in this example includes modules (or objects) 41-44, which are described further below. Adapter $104_1$ further includes a communication layer that, in this example, includes web services logic 403 and publishing/consuming logic 404. Web services logic 403 represents support for real-time interaction between systems. Thus, the communication layer of this example has two halves: 1) the web services logic 403 that deals with real-time interactions, and 2) the publishing/consuming logic 404 that deals with data publishing and/or data consuming as described herein. In certain embodiments, the associated application 400 may desire to have certain data that it consumes from other applications stored locally in its own datastore, wherein the publishing/consuming logic 404 can be used for such consumption of data; and certain other data can remain in the publishing application and the consuming application can request that data on demand via the web services logic 403. Of course, in certain embodiments, the web services logic 403 may be omitted from adapter $104_1$, as the publishing/consuming logic 404 supports the inventive concepts described herein. As described further herein, in certain embodiments, a given adapter coupled to an application may include only one of publishing functionality and consuming functionality in logic 404, or may include both.

Adapter $104_1$ further includes adapter agent layer 405, which as described further below may log, to consumption log 800, information regarding consumption of data by application 400 from one or more publishing applications or adapters (e.g., the time of the last successful consumption of data from each publishing application, etc.).

Business logic modules 41-44 in this example represent the various subject areas that may be included in a case management interface. Each subject area could, in some instances, be published and consumed on a different frequency and/or in a different format. In operation, the modules 41-44 of business logic layer 402 gather information via application interface 401 from source(s) (e.g., databases) of application 400 for publishing (e.g., claim data, member data, provider data, etc.), translate the data into consumable-friendly content, and then publish the data via publishing/consuming logic 404 in formats 304-306. In certain embodiments, adapter $104_1$ is operable to enable application 400 to consume data published by other applications. In that case, publishing/consuming logic 404 reads data published by another application's publishing adapter. Business logic layer 402 translates the read data from its standardized format into the proper format desired by application 400, and supplies that translated data to application 400 via interface layer 401. Exemplary business logic layer 402 includes illustrative modules that may be implemented for a third-party payer healthcare system. Of course, other modules may be implemented instead of or in addition to those illustrated in FIG. 4, and application of the concepts described herein is not limited to a third-party payer healthcare system.

As described further herein, in certain embodiments publishing logic (404) of adapter $104_1$ is operable to publish data in one or more formats and according to one or more publishing schedules. Thus, adapter $104_1$ may publish data of application 400 in accordance with a different publishing regime than is natively supported by application 400, and such published data may be consumed by other disparate applications. Further, application 400 may desire to consume data from other disparate applications. That is, application 400 may be both a publishing and a consuming application. As a consuming application, application 400 may define a consumption schedule that differs from the publishing schedule defined by an adapter of a publishing application from which the application 400 desires to consume data. For instance, consuming application 400 may have a native consumption schedule for consuming various types of data from other applications and/or the consuming application may allow a user to define such consumption schedule. In either case, the consuming logic (404) of adapter $104_1$ may maintain a consumption log 800, as described further herein, to support consumption by its associated consuming application 400 of the data published by a disparate publishing application in accordance with the consumption schedule defined by the consuming application 400.

As described further below in connection with FIGS. 5 and 6, in certain embodiments, a publishing schedule can be defined for a publishing adapter associated with a given application. It should be recognized that the consumption schedule defined for a consuming application is not required to be the same as the publishing schedule defined for the application from which data is to be consumed. Thus, a consuming application can implement a different consumption schedule than the publishing schedule implemented by a disparate application (or its respective publishing adapter) from which the consuming application desires data. That is, the consumption schedule followed by a consuming application is not required to conform to the publishing schedule of the application (or publishing adapter) from which the data is to be consumed. Having a different consumption schedule than the publishing schedule is supported at least in part because of the below-described consumption log that is maintained by the consuming adapters.

As mentioned above, a different publishing format can be used for consumption of data for an initial data load (IDL) than for subsequent data accesses. For instance, in certain embodiments, a user interface is provided by the adapter to enable a user to select the publishing format to be used for an IDL, as well as to select the publishing format to be used for consumption of subsequent data consumptions. That is, the user interface allows a user to configure a consuming adapter with regard to various aspects of its consuming regime, including a consuming schedule and published formats to be used for consumption of different data types and at different times (such as for an IDL versus subsequent data accesses).

Figure 5:
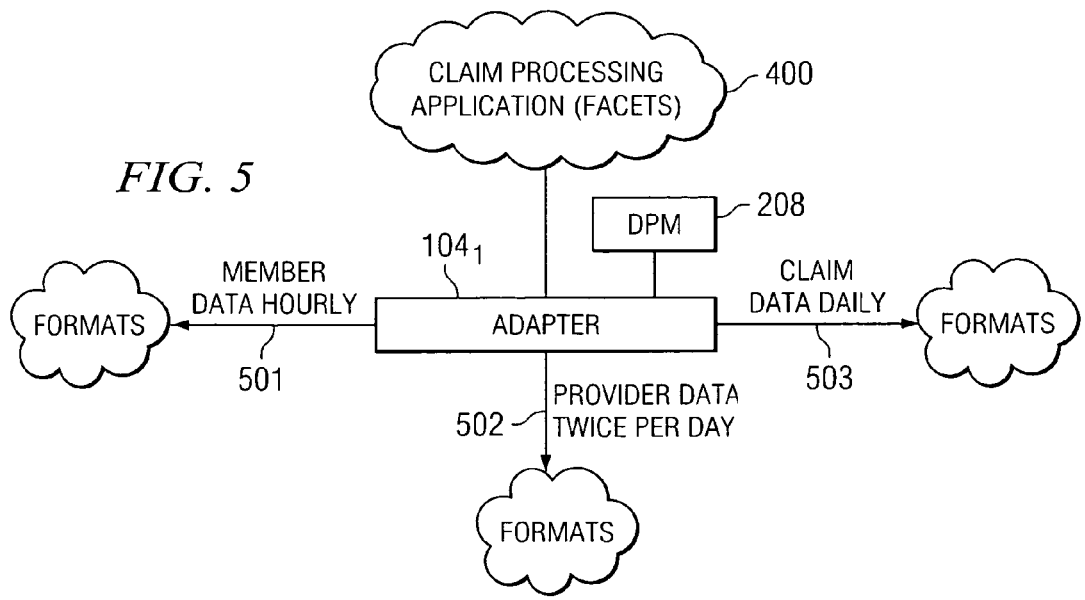
FIG. 5 shows an exemplary scenario in which a publishing adapter publishes different data from an application according to different publishing schedules defined for each data type.

FIG. 5 shows an exemplary scenario in which a publishing adapter (shown in this example as adapter $104_1$ of FIG. 4) publishes different data from an application (shown in this example as application 400 of FIG. 4) according to different publishing schedules defined for each data type. As described above, certain embodiments hereof enable a consumption schedule to be defined for a consuming adapter. Further, certain embodiments enable a publishing schedule to be defined for a publishing adapter. The publishing schedules can be defined differently for different types of data to be published by the adapter. For instance, in the illustrated example of FIG. 5, member data (as gathered by member module 42 of FIG. 4) is scheduled to be published by adapter 104₁ hourly, as shown by publishing 501. Provider data (as gathered by provider module 43 of FIG. 4) is scheduled to be published by adapter 104₁ twice per day, as shown by publishing 502. Claim data (as gathered by claim module 41 of FIG. 4) is scheduled to be published by adapter 104₁ daily, as shown by publishing 503. As described above with FIG. 4, the member data, provider data, and claim data may each be published in various formats 304-306. The publishing schedules defined for each data type by adapter 104₁ may differ from the publishing schedules, if any, natively supported by application 400 (such as the native publishing schedule 103 of application 101 of FIG. 1).

FIG. 6 shows an exemplary user interface for defining a publishing schedule for a publishing adapter according to one embodiment of the present invention. This exemplary publishing schedule defines when the data is published from the publishing application. Various subject areas of data published by the publishing application can be published according to different publishing regimes (e.g., different formats and/or publishing schedules). This exemplary screen shot of FIG. 6 also shows that IDLs can be scheduled along with daily transaction runs (UPDATES). The screen shows whether each publication event is currently active, the status of the last execution, and the publication frequency. If the publishing application is active, the next scheduled run time is shown.

IDLs can also be segmented into smaller publishing cycles. The primary key start and primary key end are used for this purpose. For example, if the claim system is for a large healthplan having 20 million claims to publish for the last year, it may be desirable to publish claims one month at a time. This can be achieved by scheduling 12 publishing events, each one using a date range for one month out of the year.

Figure 7:
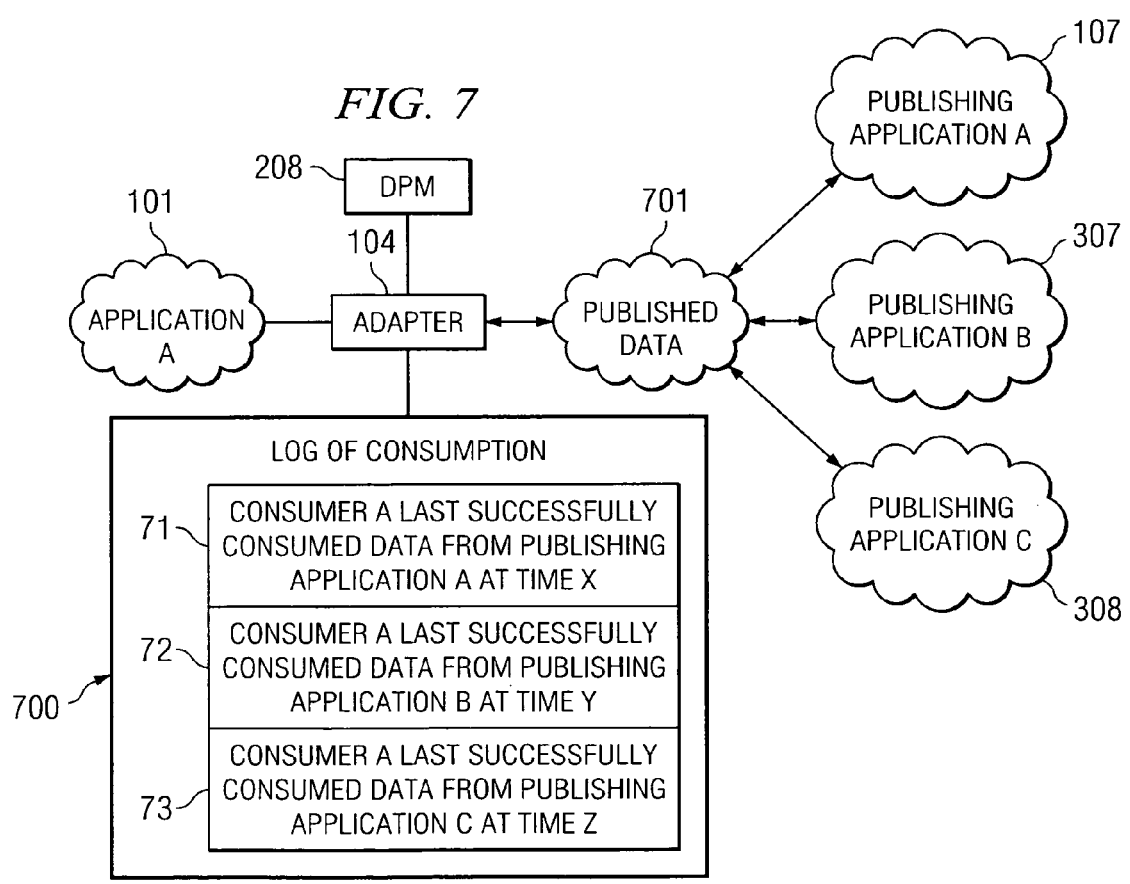
FIG. 7 shows an exemplary embodiment of a consuming adapter that maintains a consumption log for its consuming application.

According to certain embodiments hereof, a consuming adapter associated with a consuming application which desires to consume data from one or more other publishing applications maintains a consumption log that provides information concerning the consumption of data by its consuming application each of the one or more other publishing applications (e.g., identifying the time of the last successful data consumption from each of the publishing applications). Turning to FIG. 7, an exemplary embodiment of a consuming adapter that maintains a consumption log for each publishing application from which it consumes data is shown. As shown, consuming adapter 104 is associated with consuming application 101, which desires to consume data from various publishing applications 107, 307, and 308. As described above, each of publishing applications 107, 307, and 308 may have associated therewith a publishing adapter (not shown) that publishes data 701 in one or more standardized formats and according to a defined publishing schedule. Consuming application 101 has consuming adapter 104 associated therewith to enable it to consume the published data 701. Consuming adapter 104 maintains consumption log 700, which may be a database, file, or other suitable data organization, which includes information concerning the consumption by application 101 of published data 701 from each of the publishing applications 107, 307, and 308. For instance, in this example consumption log 700 includes entry 71 that identifies the time that consuming application 101 last successfully consumed the data published by publishing application 107, entry 72 that identifies the time that consuming application 101 last successfully consumed the data published by publishing application 307, and entry 73 that identifies the time that consuming application 101 last successfully consumed the data published by publishing application 308.

FIG. 8 shows an exemplary consumption log maintained by a consuming adapter in accordance with one embodiment.

Figure 9:
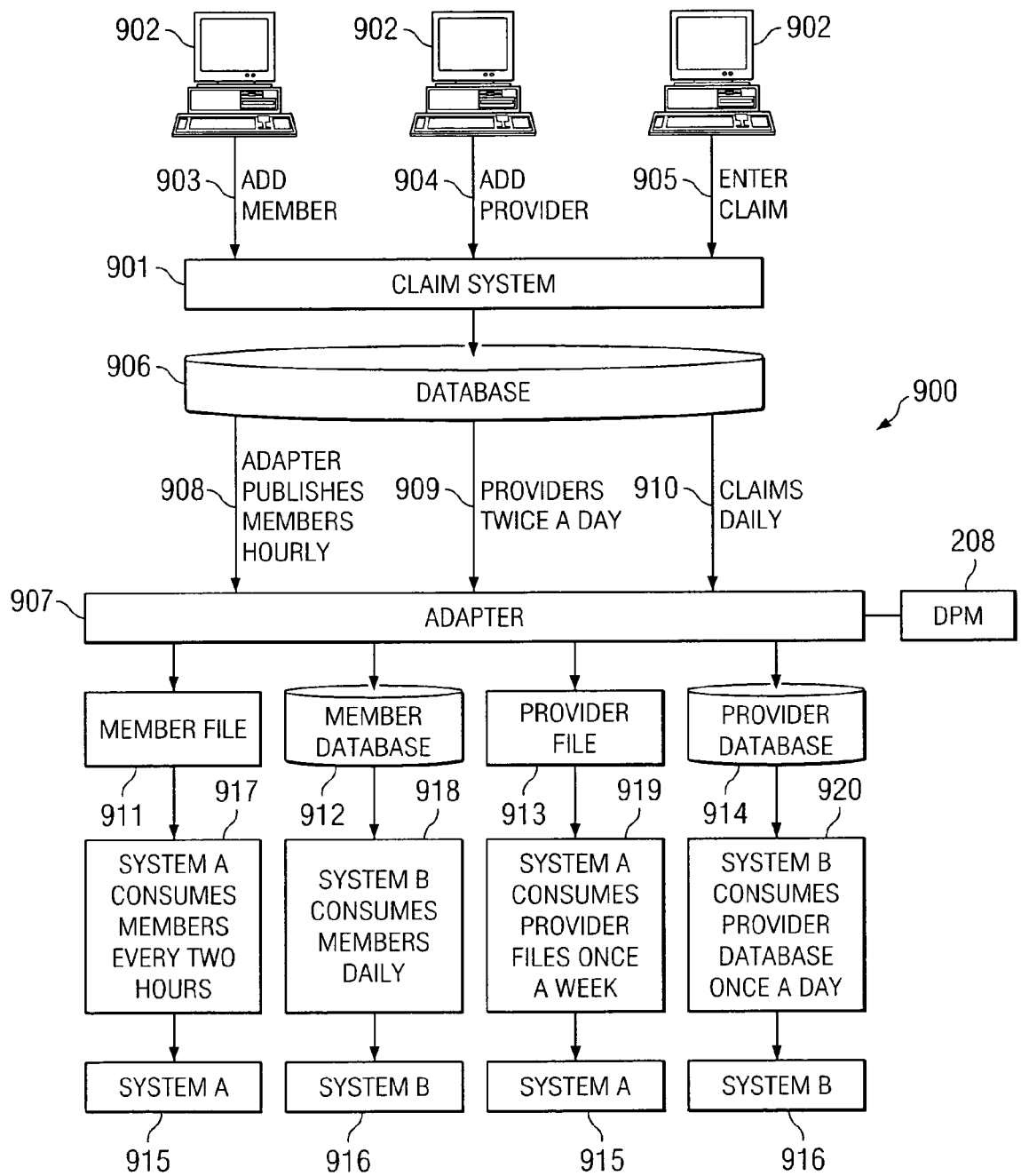
FIG. 9 shows an exemplary embodiment implemented within a third-party payer health care system.

FIG. 9 shows an exemplary embodiment implemented within a third-party payer health care system. Exemplary system 900 includes various workstations 902 through which data may be entered into claim system 901. For instance, in this example, data 903 adding a new member, data 904 adding a new provider, and data 905 entering a claim are input to claim system 901. Claim system 901 stores this data to its local data store, such as database 906. A publishing adapter 907 is associated with claim system 901, and such publishing adapter 907 is configured to access database 906 and publish member data 908 (e.g., data identifying newly added members, deleted members, changes in member information, etc.) on an hourly basis, publish provider data 909 (e.g., data identifying newly added providers, deleted providers, changes in provider information, etc.) twice a day, and publish claims data 910 daily. As described above, the data may be published in various formats. For example, adapter 907 publishes member data 908 to a file 911 and to a database 912; and adapter 907 publishes provider data 909 to a file 913 and to a database 914.

Disparate systems A 915 and B 916 may desire to consume the data published by adapter 907. As described above, each of such systems 915 and 916 may have associated therewith consuming adapters (not shown). As further described above, the consuming adapters may define a consuming regime for their respective consuming systems 915 and 916. In the illustrated example of FIG. 9, system 915 has an associated consuming adapter (not shown) that defines a consuming regime 917 according to which system 915 consumes member data from the published file format 911 every two hours, and system 915's associated consuming adapter further defines a consuming regime 919 according to which system 915 consumes provider data from the published file format 913 once a week. Further, in the illustrated example of FIG. 9, system 916 has an associated consuming adapter (not shown) that defines a consuming regime 918 according to which system 916 consumes member data from the published file format 911 on a daily basis, and system 916's associated consuming adapter further defines a consuming regime 920 according to which system 916 consumes provider data from database 914 once a day. Thus, as this example illustrates, a publishing adapter may publish data in various formats and according to various publishing schedules, and consuming adapters may define their own consuming regimes, including the published format to be used for consumption of certain data as well as the consumption schedule for consuming such data.

In view of the above, because the adapters provide support for the publishing/consuming regimes desired by each application, the applications themselves are not required to be modified to support such regimes. For instance, the adapters handle the translation of data into a format desired (and includes the content desired) by a consuming application. Again, a publishing adapter may publish the data of a publishing application in one or more standardized formats (and including certain content, which may or may not be natively published by the publishing application), and a consuming adapter may receive such published data and translate the data from the standardized format into a format desired by the consuming application (including selecting from the published data the particular content desired by the consuming application). For example, the publishing adapter may publish data to a file (which may not be natively supported by the publishing application with which the publishing adapter is coupled), and such data published by the publishing adapter may include a large selection of data content (some of which may not be natively published by the publishing application), such as healthplan members' names, addresses, age, gender, benefit codes, medical services codes, etc. Further, each of the large selection of data content may be published in a standardized format, such as first-name-first, defined medical service codes, etc. A consuming adapter may receive the published data and determine the portion of that data content (which may be all of such published data content) desired by its consuming application, and translate the desired portion of such data content from the standardized format into a native format desired by the consuming application. Again, all of the support for the publishing regime is provided by the adapters and is transparent to the publishing and consuming applications.

As a further example of the adapters providing support for a desired publishing/consuming regime, as mentioned above and as described further herein, the consuming adapter may support consumption of data by its consuming application on a different schedule than the data is published by a publishing application (or publishing adapter). In certain embodiments, the consuming adapter maintains a consumption log to keep track of the last successful consumption by the consuming application of data from a given publishing application, which may aid in maintaining data integrity between the publishing and consuming applications. Again, support for consuming data on a schedule that differs from a publishing schedule, and maintaining data integrity, is provided by the adapters in a manner that is transparent to the consuming and publishing applications.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
a processor-based device;
a first application executing on said processor-based device;
a first adapter interfaced with said first application, said first adapter is configured to publish data of said first application for consumption by another application, wherein said first adapter publishes said data of said first application according to a publishing regime not natively supported by said first application, wherein said another application does not natively support consumption of said data of said first application published by said first adapter, and wherein said publishing regime not natively supported by said first application comprises at least one of: (a) a publishing schedule not natively supported by said first application, and (b) a data content not natively published by said first application; and a second adapter communicatively interfaced with said another application, wherein said second adapter enables said another application to consume said data of said first application published by said first adapter, wherein said second adapter maintains a consumption log that identifies at least the last successful consumption by said another application of said data of said first application published by said first adapter, wherein said second adapter defines a consuming regime to be used for consumption by said another application of said data of said first application published by said first adapter, wherein said first and second adapters communicate directly with each other in an adapter common communication bus format, and wherein said consuming regime differs from the publishing regime according to which the first adapter publishes the data of the first application.

2. The system of claim 1 wherein said publishing regime not natively supported by said first application comprises:
a data format not natively supported by said first application.

3. The system of claim 1 wherein said publishing regime not natively supported by said first application comprises:
a publishing schedule not natively supported by said first application; and
data content not natively published by said first application.

4. The system of claim 1 wherein said publishing regime not natively supported by said first application comprises:
a data format not natively supported by said first application; and
a publishing schedule not natively supported by said first application.

5. The system of claim 1 wherein said first adapter is further configured to aggregate data from a plurality of different data stores of said first application for publishing.

6. The system of claim 1 wherein said publishing regime specifies at least one of the following:
a published format to be used for receipt by said second adapter of said data published by said first adapter, and a consumption schedule according to which said data published by said first adapter is to be consumed by said second adapter.

7. The system of claim 1 wherein said second adapter translates said data published by said first adapter into a format natively supported by said another application.

8. A method comprising:
communicatively interfacing a first adapter to a first application that is executing on a processor-based device;
said first adapter publishing data of said first application, for consumption by another application, according to a publishing regime not natively supported by said first application, wherein said another application does not natively support consumption of said data of said first application published by said first adapter and wherein said publishing data according to said publishing regime not natively supported by said first application comprises publishing said data according to a publishing schedule not natively supported by said first application;
communicatively interfacing a second adapter to said another application, wherein said second adapter enables said another application to consume said data of said first application published by said first adapter, wherein said second adapter maintains a consumption log that identifies at least the last successful consumption by said another application of said data of said first application published by said first adapter, wherein said second adapter defines a consuming regime to be used for consumption by said another application of said data of said first application published by said first adapter, wherein said first and second adapters communicate directly with each other in an adapter common communication bus format, and wherein said consuming regime differs from the publishing regime according to which the first adapter publishes the data of the first application.

9. The method of claim 8 wherein said publishing data according to said publishing regime not natively supported by said first application comprises:
publishing said data in a data format not natively supported by said first application.

10. The method of claim 8 wherein said publishing data according to said publishing regime not natively supported by said first application comprises:
publishing data content not natively published by said first application.

11. The method of claim 8 further comprising:
said first adapter aggregating said data from a plurality of different data stores of said first application.

12. The method of claim 8 further comprising:
said second adapter translating said data published by said first adapter into a format natively supported by said another application.

13. The method of claim 8 wherein said first adapter comprises software executing on a processor-based device for performing said publishing.

14. A system comprising:
a processor-based device;
a first application executing on said processor-based device;
a means, communicatively interfaced with said first application, for publishing data of said first application for consumption by another application, wherein the publishing means publishes said data of said first application according to a publishing regime not natively supported by said first application, wherein said another application does not natively support consumption of said data of said first application published by said first adapter, and wherein said publishing regime not natively supported by said first application comprises publishing data content not natively published by said first application;
a means, communicatively interfaced with said another application, for enabling said another application to consume said data of said first application published by said means for publishing data, wherein said consuming means enables said another application to consume said data of said first application published by said publishing means, wherein said consuming means maintains a consumption log that identifies at least the last successful consumption by said another application of said data of said first application published by said publishing means, wherein said consuming means defines a consuming regime to be used for consumption by said another application of said data of said first application published by said publishing means, wherein said publishing means and consuming means communicate directly with each other in an adapter common communication bus format, and wherein said consuming regime differs from the publishing regime according to which said publishing means publishes the data of the first application.

15. The system of claim 14 wherein said publishing regime not natively supported by said first application further comprises at least one selected from the group consisting of:
publishing said data in a data format not natively supported by said first application, and publishing said data according to a publishing schedule not natively supported by said first application.

16. The system of claim 14 wherein the publishing means is configurable as to at least one of publishing schedule and publishing format.

17. The system of claim 14 wherein said publishing means comprises software executing on said processor-based device.

18. A system comprising:
a processor-based device;
a first application executing on said processor-based device;
a second application that desires to consume data from said first application;
a publishing adapter communicatively interfaced with said first application, said publishing adapter is configured to publish data of said first application; and
a consuming adapter communicatively interfaced with said second application, wherein said consuming adapter maintains a consumption log that identifies at least the last successful consumption of said data of said first application by said second application,
wherein said publishing adapter communicates said published data directly with said consuming adapter in an adapter common communication bus format,
wherein said publishing adapter publishes said data of said first application according to a publishing regime that is not natively supported by said first application; and
wherein said publishing regime that is not natively supported by said first application comprises at least one of: (a) a publishing schedule not natively supported by said first application, and (b) data content not natively published by said first application,
wherein said publishing and consuming adapters communicate directly with each other in an adapter common communication bus format, and wherein said consuming regime differs from the publishing regime according to which the publishing adapter publishes the data of the first application.

19. The system of claim 18 wherein said second application desires to consume said data according to a different regime than a regime in which said first application publishes said data.

20. The system of claim 19 wherein the publishing adapter publishes said data of said first application according to a publishing regime not natively supported by said first application.

21. The system of claim 18 wherein the consuming adapter determines the data to obtain from the publishing adapter based at least in part on said consumption log.

22. The system of claim 21 wherein said consuming adapter obtains any changes in said data since the last successful consumption of said data by said second application.

23. A system comprising:
a processor-based device;
a first application executing on said processor-based device;
a second application that desires to consume data from said first application;

a publishing adapter communicatively interfaced with said first application, said publishing adapter is configured to publish data of said first application according to a publishing regime not natively supported by said first application, wherein said publishing regime comprises at least one of: (a) a publishing schedule not natively supported by said first application, and (b) data content not natively published by said first application; and a consuming adapter communicatively interfaced with said second application, said consuming adapter is configured to access said published data for consumption by said second application, wherein said consuming adapter enables said another application to consume said data of said first application published by said publishing adapter, wherein said consuming adapter maintains a consumption log that identifies at least the last successful consumption by said another application of said data of said first application published by said publishing adapter, wherein said consuming adapter defines a consuming regime to be used for consumption by said another application of said data of said first application published by said publishing adapter, wherein said publishing and consuming adapters communicate directly with each other in an adapter common communication bus format, and wherein said consuming regime differs from the publishing regime according to which the publishing adapter publishes the data of the first application.

24. The system of claim 23 wherein said consuming adapter is configured to translate said published data to a format natively supported by said second application.

* * * * *